3,414,373
PREPARATION OF ACTIVE CUPROUS HALIDE SORBENTS BY TWO-STAGE DECOMPLEXATION

Merlan M. Lambert, Westfield, N.J., assignor to Esso Research and Engineering Company, a corporation of Delaware
No Drawing. Filed Mar. 9, 1966, Ser. No. 532,837
10 Claims. (Cl. 23—97)

ABSTRACT OF THE DISCLOSURE

Active cuprous halide sorbents are prepared by contacting raw salt with a conditioning ligand in the presence of a close boiling olefin, separating the complexed salt, stripping to remove monoolefin while partially decomplexing the salt, and then fully decomplexing the salt.

---

This invention is directed to an improved process for preparing sorption-active cuprous halide sorbent particles having improved average particle size and distribution and containing very little "fines," viz, sorbent particles having a particle size (diameter) less than about 20 microns.

Recently there has been developed a process for selectively separating and recovering complexable ligands from liquid or gaseous streams containing them, which process involves the use of novel cuprous halide sorbent particles having a porosity of above about 10% (of the total volume of a particle) being 550 to 10,000 angstrom unit (A) pores. Above 50% of these particles have a particle size within the range of 10 to 600 microns. Moreover, said process is capable of selectively separating and recovering complexable ligands by preferential complexation (separation) and decomplexation (recovery) of a given preferentially complexable ligand from a mixture thereof with other close boiling materials including other ligands which complex with the cuprous halide sorbent but less preferentially.

The complexation is exothermic and is conducted by contacting the feed stream containing the ligand sought to be recovered with the abovementioned porous, sorption-active cuprous halide sorbent particles, either in the gaseous or liquid phase, to form a cuprous halide-ligand complex (readily separable from the remainder of the feedstream). This complex formation is frequently referred to as "sorption," and the term "sorption" as used herein is synonymous with complexation. Moreover, "sorption" is intended to include both absorption and adsorption as both phenomena can be involved.

The separated "sorbed" ligand (in complex form) is then recovered from the complexed particles in a highly pure form, by decomplexation thereof (treating said complexed sorbent particles to desorb the ligand therefrom). Since decomplexation is endothermic, decomplexation is conducted thermally, e.g. by heating the complexed particles to liberate the ligand. A more complete description of the preparation and use of said novel, porous, sorption-active cuprous halide sorbent particles is contained in U.S. patent applications Ser. Nos. 333,925 (Robert B. Long and Warren Alfred Knarr) and 333,926 (Robert B. Long) both of which were filed on Dec. 27, 1963, and now both abandoned; and the disclosure of said applications is incorporated herein by reference. Frequently, these cuprous halide sorbent particles are employed in the form of fixed or fluidized beds and the feedstream is contacted therewith.

When the ligand separation and recovery process is conducted using said sorbents in fluidized bed, it has been discovered that advantageous recovery can be secured when using cuprous halide sorbent particles containing mostly 20+ micron ($\mu$) size (diameter) particles with minimal fines and spines. The term "spines" as used herein refers to active fines sorbent particles having a diameter of $<10\mu$ (and usually $<1\mu$). The presence of fines and spines detracts from ligand recoveries and reduces the efficiency of the ligand recovery process because these materials elutriate from the fluidized sorbent bed, viz. are carried upwardly out of said bed by the fluidizing media. Moreover spines tend to attach themselves to the main particles causing poor solids flow properties resulting in poor fluidization during gas-solids contacting. They also stick to reactor internals reducing heat transfer and plugging fines separation devices.

Therefore it is an object of the present invention to overcome these and other problems by providing a sorbent preparation process resulting in porous, sorption-active cuprous halide sorbents of improved particle size and distribution and having excellent fluidization properties with reduced fines (and spines) content. These and other objectives will be apparent from the detailed description which follows. Unless otherwise stated all parts, concentrations and percents are by weight.

The improved process of this invention can be viewed as having two main embodiments, one primarily providing process for preparing a readily fluidizable sorbent and comprising three main phases: (1) complexation of raw cuprous halide salt particles with a conditioning ligand in the presence of a close boiling olefin(s), (2) stripping said olefin(s) from said particles while simultaneously partially decomplexing said particles to remove substantially all of said close boiling olefins therefrom, and (3) conducting the major amount of decomplexing in the absence of said olefin(s). The other main embodiment is the provision of a process for preparing storage-stable sorbent particles capable of retaining sorptive capacity over extended periods without agglomerating and this embodiment involves phases (1) and (2) mentioned previously. Usually both the stripping and decomplexing (major) are conducted thermally with the latter occurring at higher temperatures.

Complexing

Complexing the raw cuprous halide salt particles can be conducted in the gaseous or liquid phases using aqueous or olefinic solutions or slurries of raw cuprous halide salt. A convenient way to employ the cuprous halide salt is in the form of a monoolefin solution, e.g. using $C_4$ to $C_{16}$ monoolefins or mixtures thereof to dissolve the raw cuprous halide salt. The conditioning ligand is then contacted with the cuprous halide solution to form a readily separable cuprous halide-conditioning ligand complex. Usually a conditioning ligand is used which forms a complex that is insoluble in the solvent or slurry media employed to form the cuprous halide solution or slurry.

Suitable raw cuprous halide salts which can be employed include cuprous chloride, cuprous bromide and cuprous iodide with the preferred cuprous halide salt being cuprous chloride. The purity of the cuprous halide salt should be at least about 90%. Usually the purity of the cuprous halide salt ranges from 90 to 100%, and preferably from about 95 to 100%. The moisture content thereof at the onset of the sorbent preparation procedure should not exceed about 1.0 wt. percent, and preferably should not exceed about 0.5 wt. percent (based on dry cuprous halide salt).

Initially the raw cuprous halide salt is dissolved at suitable temperatures, e.g. —40 to 80° F. in an aqueous or organic solvent such as $C_4$ to $C_{16}$ monoolefins, or mixtures thereof. Usually these solutions contain from about 1 to 60% cuprous halide. Suitable monoolefin solvents include, but are not limited to, the following: butene-1, isobutylene, pentene-1, hexene-1, heptene-1, octene-1, nonene-1, docene-1, undecene-1, dodecene-1, their isomers and mixtures thereof. The resulting cuprous halide solutions are then clarified using centrifugation, filtration, etc. to remove essentially all undissolved copper salts, e.g. cupric salts and other insolubles therefrom. The preferred way to remove insolubles is by using a low porosity precoated filter, i.e. precoated with previously removed insolubles for example by cycling the solution repeatedly past the filter to precoat it with insolubles. The thus clarified solutions are then contacted with the conditioning ligand preferably in gaseous form at temperatures from about −40 to about 120° F. and usually about −10 to 100° F., to effect complexation.

Suitable complexing agents ("conditioning" ligands) which can be employed to impart the sorption-activity to the cuprous halide salts include both materials which form only complexes having said mole ratios of copper to complexing compounds greater than 1:1 and compounds which form complexes having a mole ratio of 1:1 or less, which upon decomplexing (desorption) pass through a stable complex having a mole ratio of copper to complexing compound greater than 1:1. Thus, certain materials, e.g., nitriles, diolefins, acetylenes, carbon monoxide, etc., under ordinary conditions forming a 2:1 complex can be made to complex in ratios of copper to complexing compound of 1:1 or less. However, upon dissociation, complexing material is released selectively from the bed of cuprous halide until the stable complex, viz., the complex having a copper to complexing agent ratio above 1:1, e.g., 2:1 stoichiometric complex, is completely formed before further decomplexing to the uncomplexed (active) cuprous halide salt. In this specification by "stable complex" is meant a stoichiometric complex stable upon dissociation as described in the preceding sentence. Such "conditioning" agent (ligands) as contemplated herein are carbon monoxide, organic nitriles, organic compounds having an acetylenic group, i.e., as present in acetylene, $C_3$ to $C_{20}$ polyolefins, e.g., allene, and especially $C_4$ to $C_{10}$ conjugated diolefins, e.g., butadiene, isoprene, etc. More than one of these functional groups can be present in the single molecule of the complexing compound. In addition, the complexing compounds can contain other functional (complexable) groups so long as these groups do not interfere with complex formation. The preferrred "conditioning" ligand is butadiene due to its ability to impart high sorptive capacity to the cuprous halide salts.

The complexing step is conducted in the presence of a close boiling monoolefin because the presence thereof during complexing serves to enhance the rate of complexation. If a close boiling monoolefin were employed as a solvent or component thereof to dissolve the raw cuprous halide salt, none need be added prior to complexation. If this were not the case, then one or more of such olefins would be added prior to complexing. Frequently the close boiling olefin will contain the same number of carbon atoms as the conditioning ligand. The term "close boiling monoolefin" as used herein refers to a monoolefin(s), including mixtures thereof having (1) a boiling point within about 20° F. (and more preferably 10° F.) of that of the conditioning ligand, and (2) the ability to be sorbed by the cuprous halide salt but less preferentially than the conditioning ligand, and preferably considerably less preferentially than the conditioning ligand.

Stripping

After the complexing has been accomplished, e.g. in the manner indicated hereinabove, the complexed cuprous halide particles are separated from the main body of solvent. Then these solvent-wet cuprous halide-conditioning ligand complex particles can be initially deliquified to a liquid content of from about 20 to about 300 wt. percent (based on dry complex solids) by centrifugation hydrocloning, rotary drum drying (at temperatures below stripping and decomplexing temperatures) or any other suitable deliquefying procedures. The initially deliquified complex particles are then stripped of said close boiling monoolefin materials and simultaneously decomplexed by heating said complex particles, preferably while fluidizing them although this is not necessary. Initial deliquification (to the extent indicated) prior to stripping is preferable, but not mandatory.

The complexed particles are then treated to strip residual and sorbed close boiling monoolefin(s) while simultaneously partially decomplexing said particles by heating said complex particles at temperatures and pressure conditions amenable to remove essentially all of said monoolefin(s) and from about 0.5 to about 30% of the sorbed (complexed) conditioning ligand. Thus after stripping the complex particles contain from about 70 to 9.5% of the theoretically possible maximum amount of conditioning ligand in complex and less than 1% and preferably less than about 0.5% of said close boiling monoolefin(s), e.g., $<0.5\%$ to 0.0% thereof. The precise extent of partial decomplexing to be conducted varies depending primarily upon the particle size of the complex particles (in general the smaller the particle size the more partial decomplexing to be conducted), the concentration of given size particles in the mixture of various particle sizes, i.e. the particle size distribution, the specific conditioning ligand used and to a lesser extent the specific close boiling monoolefin(s) present during complexing. The optimum percent of complexed ligand removed from the complex particles during stripping (assuming perfect spherical shaped particles, perfect heat distribution, and perfect contact of the complex particles with the stripping gas) is the minimum to insure removal of all the close boiling monoolefin(s) and to decomplex the surface (outermost) layer of crystallites in the sorbent particles. For example, when the conditioning ligand is the preferred butadiene and the close boiling monoolefins are butenes (chiefly butene-1 and isobutylene) the opitmum percent of conditioning ligand remaining on the partially decomplexed particles is as follows dependent on average particle size:

| Average particle size (microns): | Percent complexed after stripping (percent of theoretical capacity) |
|---|---|
| 20 | 95 |
| 50 | 98 |
| 90 | 99 |

Of course, the above values assume perfect heat distribution and contact during stripping, both of which are never quite attainable. Hence practical cost considerations indicate the advisability of removing more conditioning ligand during the simultaneous stripping-partial decomplexing phase than would be necessary under optimal heat distribution and contact conditions. This is the case because while said optimum conditions can be closely approached by very sensitive temperature control, heat exchanging and contact of sorbent particles with stripping gas, these refinements increase the cost of the stripping-partial decomplexing phase in a manner disproportionately high in view of the beneficial results secured thereby. In other words for most purposes it is more practical to partially decomplex said particles to an extent that from about 70 to 90% (of theoretical) of conditioning ligand remains on the particles after said stripping-partial decomplexing phase.

Usually the stripping-partial decomplexing is conducted at temperatures ranging from about 100 to about 200° F. and comparable pressures of atmospheric to about 50 p.s.i.g. Preferred temperature and pressure conditions range from about 150 to 190° F. and atmospheric pressure to 5 p.s.i.g. Preferably the complex particles are fluidized during the stripping-partial decomplexing phase as this enhances heat distribution and achieves more uniform contact of the particles with stripping gas. Usually the fluidization is conducted at superficial fluidization velocities of from about 0.1 to 20 feet per second. When the fluidization is conducted in a conventional fluid drier apparatus, superficial fluidization velocities of about 0.1 to about 0.5 feet per second are preferred whereas superficial fluidization velocities of about 5 to 20 feet per second are preferable when using a transfer lined drier. The term "superficial fluidization velocity" as used herein means average gas velocity through the containing vessel or line.

The average residence time of the cuprous halide-butadiene complex particles under batch fluid drying-partial decomplexing conditions usually ranges from 30 to 120 minutes, depending on the stripping gas used, the temperature and gas rate. The stripping procedure results in a cuprous halide partially decomplexed sorbent particle having a liquid content ranging from 0 to about 0.5 wt. percent (based on solids). At the conclusion of the simultaneous stripping and partial decomplexing procedure, the cuprous halide partially decomplexed particles have the following typical properties:

| Property: | Typical values |
|---|---|
| Appearance | Smooth, rounded particles. |
| Avg. particle size, $D_p$, $\mu$ | 90. |
| Particle size distribution, wt. percent: | |
| 0–20$\mu$ | 1.6. |
| 20–50$\mu$ | 4.4. |
| 50–80$\mu$ | 28.4. |
| 80+$\mu$ | 65.6 (chiefly 80 to 110$\mu$). |
| Roller attribution B, wt. percent/hr. | 0.5–3.5. |
| Surface area, $M^2/g$. | 5–8. |
| Pore volume, cc./g. | <0.01. |
| Crystallite size, A. | 500–900. |
| Complex remaining, percent theory | 80–90. |

The dried, stripped partially decomplexed particles prepared as above are stable under storage, and must then be complexed before employing directly as sorbents to selectively sorb complexable ligands from streams containing them, e.g. butadiene, from $C_4$ hydrocarbon mixtures or streams containing varying amounts of butadiene along with butenes. While any suitable stripping gas can be used, e.g., monoolefins such as isobutylene, it is preferable to strip using a dry inert material in gaseous form to fluidize and strip. Of course, inert gases (inert to reaction with the cuprous halide sorbent) can be used in admixture with the conditioning ligand or other ligands.

Suitably exemplary inert fluidizing and stripping gases include, but are not limited to, the following: Nitrogen, methane, propane, butane, dry air, etc. It is advisable to prevent entry of the mother liquor (liquid media in which complexing occurs) into the stripping phase as this liquid can cause adverse agglomeration of the main discrete particles resulting in excessive attrition and "spiney" particles, viz, main particles having tiny spines adhering to them. Such particles fluidize poorly as noted above.

A surprising advantage resulting from the simultaneous stripping-partial decomplexing phase resides in the ability of said phase to impart a desirable combination of properties to the sorbent particle, viz (1) stability in storage (even over extended periods), (2) retention of sorptive capacity (when said particles are decomplexed), (3) resistance to degradative influences of air and moisture (i.e., detrimental oxidation and hydrolysis to inactive states and forms), and (4) attrition resistance (especially important when said particles are activated and used in fluidized bed olefin or other complexable ligand separation and recovery processes). For example 90-day comparative storage tests reveal that cuprous chloride-butadiene complex particles chiefly in the 20 to 110 micron range when simultaneously stripped of butenes (present in complexation) and partially decomplexed to an extent where from 70 to 90% (of theoretical) of the butadiene conditioning ligand remains complexed undergo considerably less adverse agglomeration in storage than fully comparable particles complexed, but neither stripped of butenes nor partially decomplexed, or if stripped of butenes but not partially decomplexed. The term "adverse agglomeration" as used herein refers to the tendency of complex particles to adhere or stick together with one another resulting in reduction in overall porosity and substantial increase in particle size resulting in reduction in fluidization properties. Adverse agglomeration can also detrimentally affect sorptive capacity perhaps by reducing porosity of the sorbent particles. Moreover, such large agglomerated particles are less resistant to attrition than non-agglomerated particles. "Attrition" as used herein is used in the normally accepted sense in this art, viz. the breakup of particles into smaller-sized particles when particles are contacted with one another, e.g. in fluidized beds. Since attrition produces an increase in fines and spines (which are undesirable as noted hereinabove), the enhanced attrition resistance attainable by the present invention by avoidance of agglomeration constitutes an important advantage of the present process. This is especially evident when large sorbent inventories are maintained over fairly long storage periods, e.g. 30 days or more.

As mentioned hereinbefore, the process of this invention leads to active cuprous halide sorbent particles having less fines and spines than previously attainable. While it is difficult to pinpoint the reason for this, one plausible theory is that active spines (and fines) are produced during the complexing stage, but that during the stripping-partial decomplexing stage these spines (and fines) are beneficially removed from the larger particles and agglomerated (or grouped together) to form more of the desired larger-sized, more readily fluidized and less elutriatable particles, i.e. those in the 20 to 110 micron range. While these "beneficially agglomerated" particles are not as attrition resistant as the main particles, they are fluidizable and better than fines and spines. Thus the present invention reduces adverse agglomeration and apparently enhances beneficial agglomeration thus resulting in increased production of active sorbent having the desired fluidization properties and particle size distribution.

Additional 90-day comparative storage tests revealed that the complexed and stripped-partially decomplexed cuprous halide particles produced in accordance with this invention are more resistant to degradative influences (primarily oxidation and hydrolysis) than particles of the same cuprous halide having the same average particle size only complexed and fully decomplexed. For example, cuprous chloride-butadiene complex particles chiefly in the 20 to 110 micron range when simultaneously stripped of butenes and partially decomplexed to the 70 to 90% remaining complex level possessed greater sorptive capacity after 90-day's storage at which time they were decomplexed and tested for sorptive capacity than fully comparative cuprous chloride particles which were butadiene complexed and fully decomplexed, stored for 90 days and then tested for sorptive capacity under the same sorptive capacity testing conditions. Analysis of the complexed, fully decomplexed and stored (latter) particles showed a greater amount of materials which are comparatively sorption-inactive (chiefly cupric salts, hydrates and hydroxides) than present in the sorbent particles produced in accordance with this invention, i.e. the former.

Decomplexing

The stripped, partially decomplexed cuprous halide particles are then activated by the major decomplexation thereof, viz, subjecting the partially decomplexed particles to conditions of temperature and pressure such that the dissociation pressure of the complex exceeds the partial pressure of the complexed conditioning ligand, and essentially in the absence of close boiling monoolefins. Consequently, the cuprous halide-conditioning ligand complex decomposes with release of substantially the entire amount of the conditioning ligand in essentially pure form, which can be recovered by conventional gas recovery means. The liberation of the conditioning ligand leaves the cuprous halide sorbent particles in a truly sorption-active form suitable for direct use in separating and recovering complexable ligands from feedstreams containing them.

The decomplexation of the cuprous halide-conditioning ligand complex can be conducted at a wide variety of temperatures and pressure conditions essentially in the absence of close boiling monoolefins as long as the above complex dissociation criteria is observed. The exact temperature and pressures to be used will vary depending on the specific conditioning ligand employed. However, in the main decomplexing temperatures range from about 100 to about 220° F. at pressures of about 1.5 to 150 p.s i.a. Usually temperatures of about 120 to 200° F. are used with pressures ranging from 10 to 100 p.s.i.a. Preferred decomplexing conditions when the conditioning ligand is butadiene are temperatures ranging from about 140 to about 190° F. and pressures ranging from about 15 to about 75 p.s.i.a. The decomplexing can be conducted in a fluidized bed or any other convenient apparatus. When a fluidized bed is used, typical bed conditions are 140 to 190° F. at atmospheric pressure to 30 p.s.i.g. and 0.2 to 0.4 feet per second superficial gas velocity.

As noted above this decomplexing is conducted essentially in the absence of close boiling olefins as the presence of even comparatively small amounts of these materials during said decomplexing adversely affects decomplexation rate by requiring a longer time for accomplishing decomplexation. In this regard it has been discovered that the more rapid the decomplexing, the more attrition resistant are the sorption-active cuprous halide sorbent particles. Hence slow downs in decomplexing rates are undesirable as they are accompanied by a lessened resistance to attrition during usage of the active sorbent particles. Thus it has been found that the tolerable level of close boiling monoolefins during decomplexing should be kept very low, viz, below 1.0 wt. percent and preferably below 0.5 wt. percent, i.e. from <0.5 to 0.0 wt. percent.

Use of active sorbent in separation and recovery of complexable ligands

The sorption-active cuprous halide sorbent particles, prepared as indicated herein, are eminently useful to separate and recover complexable ligands from feedstreams containing them. For example, said sorbent particles can be used to recover any ligand complexable therewith, such as ammonia, carbon monoxide, HCN, $C_2$ to $C_{20}$ monoolefins (ethylene, propylene, etc,), $C_3$ to $C_{20}$ diolefins (allene), $C_4$ to $C_{20}$ conjugated diolefins (e.g. butadiene, isoprene, etc.) vinyl aromatics (e.g. styrene), and any of the complexable materials referred to hereinabove as conditioning ligands, from mixtures (feedstreams) containing them.

These separation (sorption) and recovery (desorption) processes are conducted readily by contacting the feedstream (containing the ligand) with the active cuprous halide sorbent particles. The active sorbent particles can be in the form of a fixed or fluidized bed, or in a transfer line reactor or as a liquid slurry of sorbent particles. The contact can be conducted with the feedstream in the gaseous or liquid phase. The ligand is sorbed (complexed) on the active sorbent and then desorbed to recover it, with or without an intermediate stripping phase (depending on the other feedstream components). The recovered ligands are highly pure. For example, use of the active cuprous halide sorbent particles prepared in accordance with this invention usually results in purities in the recovered ligands of 98+%, e.g. 99.5+ pure butadiene can be recovered readily from feedstreams where it is present in concentrations as low as 1%. The percent of ligand recovered (based on amount present in the feedstream) is influenced by many factors, e.g. specific ligand recovered, closeness of boiling point of the other components in the ligand-containing feedstream, number of complexing reactors used, efficiency of contact during sorption and desorption, etc. For example, butadiene recovery percent's as high as 90+% in staged plural bed complexer-based recovery processes are attainable from feeds having 1 to 50 wt. percent butadiene, e.g. where the feedstream is passed into contact with three staged serially arranged complexing vessels. Single stage complexing can recover 50+% butadiene readily as will be noted in the examples.

This invention will be illustrated in greater detail by the following examples, which are included herein to illustrate rather than limit the present invention.

Example 1

This example represents an average of eight batch runs carried out over approximately a five-day period, thus demonstrating typical preferred process conditions and results attainable according to the practice of this invention in a sorbent preparation campaign.

The cuprous halide salt solutions were prepared in an agitated batch vessel as follows: Twenty-two hundred (2,200) pounds of 99% pure isobutylene were charged to the vessel and cooled to $-5°$ F. A pressure of approximately 40 p.s.i.g. was maintained with nitrogen (to exclude entry of air). While agitation was continued, 152 pounds of powdered (200 mesh) commercial cuprous chloride (99.5+% pure) were added slowly into the liquid vortex. During salt addition the solution temperature rose somewhat, and refrigeration was used to maintain solution temperature (average) at approximately 0° F. Solution was normally 90% complete (or better) in one hour under proper continual agitation, but was maintained for two hours to assure more complete solution.

The solution was then circulated through a 10 micron filter to precoat the filter element and remove insolubles. This filtration effects essentially complete removal of undissolved solids. The filtered solution exhibited no Tyndall effect and contained 5.5% solids (130 pounds of cuprous chloride salt). This solution was then transferred through the filter to a clean batch agitated vessel for complexing of the dissolved cuprous chloride to form the insoluble cuprous chloride-butadiene complex. After transfer of this solution to the complexing vessel, the solution was cooled.

Then 51 pounds of butadiene conditioning ligand (vapor phase butadiene at 180° F.) was bubbled slowly into the solution over a two-hour period. This (51 pounds) represents a stoichiometric excess of approximately 43%. The use of 30 to 60% stoichiometric excesses of butadiene is preferred, and addition times (for uniform gas feed rates) of 1 to 3 hours are favorable with cuprous halide solutions of this size (viz, 130 pounds of dissolved cuprous chloride). The complexing temperature was held at an approximate range of 0 to $-10°$ F. (average temperature of $-3°$ F. at 40 p.s.i.g.) by refrigeration. The gaseous butadiene was introduced beneath the surface of the liquid near the agitator. The use of gaseous butadiene prevents high local concentrations of butadiene in any one zone of the body of liquid in the complexing vessel and also avoids excessive nucleation of the newly formed insoluble cuprous chloride-butadiene complex particles. Following butadiene addition mild agitation was continued for 30 minutes to facilitate essentially quantitatively complete conversion of dissolved cuprous chloride salt to insoluble butadiene complex. The slurry of complex particles thus formed was then transferred by pressure to a continuous vertical bowl centrifuge operated at about 35 p.s.i.g. The centrifuge was mounted above a fluid drier and initially deliquefied complex falls continuously by gravity into the drier below The feed rate of the slurry varied from 20 to 40 pounds per minute (average 30 lbs./min.). Normally bowl speed was operated at about 6000 revolutions per minute and deliquefication was carried out slowly over a 1 to 2 hour period using fresh isobutylene as a wash liquid in the centrifuge. The initially deliquefied solids entering the fluid drier contained approximately 0.2 pound of liquid per pound of solid. The simultaneous stripping and partial decomplexing was conducted in the fluid drier as follows.

While the solids were being charged into the drier, hot nitrogen (170° F.) at a superficial velocity of approximately 0.2 ft./sec. was used to keep the solid complex particles mobile. The drier walls were heated externally to about 200° F. During centrifugation the solids in the drier are heated to about 140° F. When centrifugation ceases, the drier is opened to vent line pressure (almost atmospheric). The hot gas velocity in the fluid drier is increased to 0.3 to 0.5 feet per second and simultaneous stripping and partial decomplexing of the complex particles begins. Care is taken to avoid heating these solids above 180° F., and the maximum solids temperature used for the runs in this example was approximately 170° F. The solids were maintained at 170° F. for one hour. If the solids are overheated, viz, at too high a temperature, more extensive decomplexing occurs resulting in loss of storage stability, annealing of the solids (reducing crystallite size and porosity, i.e., sorbent capacity) and reduction in attrition resistance (esp. when the active sorbent particles are used in a fluidized bed ligand recovery system). After stripping and partially decomplexing in the above manner, the sorbent was screened at the drier exit into lined drums to insure that no lumpy material is present at the onset of storage. The sorbent was then stored for several months. On opening the solids were charged to a fluid unit with ease via a fluid solids transfer system.

Properties of the 112 pounds (butadiene-free basis) of stripped, partially decomplexed cuprous chloride-butadiene complex particles as produced above are summarized in Table 1 below:

TABLE 1

| Property | Average value | Range |
|---|---|---|
| Appearance | Smooth, rounded particles, very few spines | |
| Average particle size, microns | 76 | |
| Particle size distribution, wt. percent: | | |
| 0 to 20μ | 1.6 | 0.3-1.8 |
| 20 to 50μ | 2.3 | 0.8-3.2 |
| 50 to 80μ | 24.4 | 22-31 |
| 80+μ | 71.7 | 61-84 |
| Roller attrition B (wt. percent per hour lost from bed) | 1.6 | 0.5-2.2 |
| Surface area (meters² per gram) | 5.2 | 5-6.3 |
| Complex remaining (percent of theory) | 79.2 | 74-85 |

After charging to the fluidized decomplexing unit and decomplexing (activating) the particles by heating at 170 to 190° F. for approximately one hour, the active cuprous chloride sorbent from the above material had the following properties as noted in Table 2, below.

TABLE 2

Property: Average value
   Appearance _____ Same as in Table 1.
   Average particle size (μ) _____ Same as in Table 1.
   Particle size distribution (wt. percent) _____ Same as in Table 1.
   Roller attrition B (wt. percent lost) _____ Same as in Table 1.
   Loose bulk density (pounds/ft.³) _____ 75.
   Pore volume (cubic centimeters/gram) _____ 0.02.
   Surface area (meters² per gram) _____ 5.2.
   Crystallite size (A.) _____ 775.
   Sorptive capacity (for butadiene) _____ 79.3.

in Standard Fluid Bed Test (percent of theory).

Example 2

This example illustrates use of the preferred cuprous halide sorbent material, prepared according to the process of Example 1, to selectively remove butadiene from a mixed $C_4$ hydrocarbon feedstream containing varying concentrations of butadiene, butenes (chiefly butene-1 and isobutylene) and some $C_4$ paraffins. Said sorbent was charged to a two-vessel fluid circulating unit for butadiene recovery tests. Solids circulation was begun and after activating the sorbent, $C_4$ vapor feed was admitted to the complexing vessel. Complexer and decomplexer conditions were then adjusted for butadiene recovery at a complexer fluid bed height of 10 feet. In one vessel the feedstream was contacted with the active sorbent to complex butadiene out of the feedstream. This complex was then passed to the decomplexing vessel where the essentially pure butadiene was liberated from the complex by heating.

Good selection recovery of butadiene having a very high purity was accomplished as noted by the results summarized below in Table 3.

TABLE 3

| Wt. percent butadiene | | Butadiene recovery, percent | Purity of recovered butadiene, wt. percent |
|---|---|---|---|
| Feed | Off gas | | |
| 35 | 12.3 | 65 | 99.6 |
| 20 | 10 | 50 | 99.6 |
| 14 | 7.5 | 54 | 99.6 |

Higher butadiene recoveries can be attained readily by staging the complexing phase, e.g., placing several complexing reactors in series and contacting the feedstream with sorbent in each complexer.

What is claimed is:

1. A process for preparing active cuprous halide sorbent particles which comprises (1) contacting cuprous halide particles with a conditioning ligand which forms a stable copper complex having a mole ratio of copper to conditioning ligand of greater than 1:1 in the presence of a monoolefin having a boiling point within about 20° F. of said conditioning ligand to form conditioning ligand-cuprous halide complex particles, which contain a portion of said monoolefin in complexed form with said complex particles, (2) recovering said complex particles which contain complexed monoolefin, (3) stripping said complex particles with an inert stripping gas at temperature and pressure conditions sufficient to remove essentially all of said monoolefin from said complex particles and to decomplex simultaneously from about 0.5 to about 30% of the complexed conditioning ligand, and (4) decomplexing said complex particles in the substantial absence of said monoolefin, thereby liberating the remainder of said conditioning ligand and activating said particles.

2. A process as in claim 1 wherein said conditioning ligand is butadiene.

3. A process as in claim 1 wherein said cuprous halide is cuprous chloride.

4. A process as in claim 1 wherein said complex particles are fluidized during said stripping and partial decomplexing using gaseous conditioning ligand to fluidize said particles.

5. A process as in claim 1 wherein said complex particles are formed in the presence of a solvent in which they are insoluble and are initially deliquefied to a liquid content of from about 20 to about 300 wt. percent prior to said stripping.

6. The process of claim 1 wherein said complex particles after stripping contain less than about 1.0 wt. percent of said monoolefin.

7. A process as in claim 6 wherein the decomplexing (4) is conducted at temperatures ranging from about 100 to about 220° F. and pressures ranging from about 1.5 to 150 p.s.i.a.

8. A process as in claim 6 wherein said conditioning ligand is butadiene.

9. A process as in claim 6 wherein said cuprous halide is cuprous chloride.

10. A process for preparing sorption-active cuprous halide sorbent particles having a porosity of above about 10% (of the total volume of a particle) being 550 to 10,000 A. pores wherein above 50% of these particles have a particle size in the range of 10 to 600 microns which comprises (1) contacting cuprous halide particles with a conditioning ligand which forms a stable copper complex having a mole ratio of copper to conditioning ligand of greater than 1:1 in the presence of a monoolefin having a boiling point within about 10° F. of said conditioning ligand to form conditioning ligand-cuprous halide complex particles which contain a portion of said monoolefin in complexed form with said complex particles, (2) recovering said complex particles containing complexed monoolefin, (3) stripping said complex particles with an inert stripping gas at temperature and pressure conditions sufficient to remove said monoolefin to a level below about 0.5 wt. percent and to decomplex simultaneously from about 0.5 to about 30% of the conditioning ligand from the complex particles, and (4) decomplexing said complex particles at conditions of temperature and pressure such that the dissociation pressure of the complex exceeds the partial pressure of the complexed conditioning ligand, in the absence of said monoolefin, thereby liberating the remainder of said conditioning ligand and activating said particles.

References Cited
UNITED STATES PATENTS

| | | | |
|---|---|---|---|
| 3,340,004 | 9/1967 | Hunter et al. | 23—97 |
| 3,348,908 | 10/1967 | Long et al. | 23—97 |
| 3,357,789 | 12/1967 | Hunter et al. | 23—97 |

OSCAR R. VERTIZ, *Primary Examiner.*

EDWARD STERN, *Assistant Examiner.*